(12) United States Patent
Peterfreund

(10) Patent No.: US 12,444,079 B2
(45) Date of Patent: Oct. 14, 2025

(54) SYSTEM AND METHOD FOR VISUAL LOCALIZATION

(71) Applicant: RAFAEL ADVANCED DEFENSE SYSTEMS LTD., Haifa (IL)

(72) Inventor: Natan Peterfreund, Kiryat Tivon (IL)

(73) Assignee: Rafael Advanced Systems LTD., Haifa (IL)

( * ) Notice: Subject to any disclaimer, the term of this patent is extended or adjusted under 35 U.S.C. 154(b) by 342 days.

(21) Appl. No.: 18/028,544

(22) PCT Filed: Sep. 29, 2021

(86) PCT No.: PCT/IL2021/051171
§ 371 (c)(1),
(2) Date: Mar. 26, 2023

(87) PCT Pub. No.: WO2022/070184
PCT Pub. Date: Apr. 7, 2022

(65) Prior Publication Data
US 2024/0257387 A1    Aug. 1, 2024

(30) Foreign Application Priority Data

Oct. 1, 2020   (IL) .......................................... 277741

(51) Int. Cl.
*G06T 7/73*     (2017.01)
*G06F 18/2415*  (2023.01)
(Continued)

(52) U.S. Cl.
CPC ............ *G06T 7/74* (2017.01); *G06F 18/2415* (2023.01); *G06V 10/40* (2022.01); *G06V 10/761* (2022.01);
(Continued)

(58) Field of Classification Search
CPC ........ G06V 20/13; G06V 20/17; G06V 10/40; G06V 10/82; G06V 10/761; G06V 10/764;
(Continued)

(56) References Cited

PUBLICATIONS

Cross-View Image Matching for Geo-localization in Urban Environments, pp. 3608-3616. (Year: 2017).*
(Continued)

*Primary Examiner* — Daniel G Mariam
(74) *Attorney, Agent, or Firm* — Mintz, Levin, Cohn, Ferris, Glovsky and Popeo, P.C.; Daniel R. Brownstone

(57) ABSTRACT

A computer-implemented method for processing a geo-location of an aerial platform, comprises: (a) providing a set of classification stages, which is trained end-to-end to provide a set of cascade decisions, wherein each cascade decision is optimized for a different classification modality and for different spatial resolution; (b) receiving a geo-location query comprising an aerial sensor image, a reference bird's eye view image-map with coordinate system and sensor pose angles measures with respect to the coordinate system; (c) projecting the aerial sensor image onto the coordinate system of the reference image-map using the pose angles measures; (d) matching between the projected sensor image and corresponding image patches in the reference satellite image-map, by applying said set of classification stages in accordance with features extraction from said images and similarity criteria; (e) generating a cascade sequencing, wherein a classification score is aggregated along a cascade path among said set of cascade stages; (f) generating a cascade decision at each stage along the cascade path based on the aggregated classification score and on defined decision logic between successive stages; (g) retrieving a geo-location associated with said aggregated classification decision; and (h) sending the retrieved geo-location to a geo-location requester.

16 Claims, 8 Drawing Sheets

(51) Int. Cl.
| | |
|---|---|
| *G06V 10/40* | (2022.01) |
| *G06V 10/74* | (2022.01) |
| *G06V 10/764* | (2022.01) |
| *G06V 10/766* | (2022.01) |
| *G06V 10/82* | (2022.01) |
| *G06V 20/13* | (2022.01) |
| *G06V 20/17* | (2022.01) |

(52) U.S. Cl.
CPC .......... *G06V 10/764* (2022.01); *G06V 10/766* (2022.01); *G06V 10/82* (2022.01); *G06V 20/13* (2022.01); *G06V 20/17* (2022.01); *G06T 2207/10032* (2013.01); *G06T 2207/20016* (2013.01); *G06T 2207/20084* (2013.01)

(58) Field of Classification Search
CPC ................ G06V 10/766; G06T 7/74; G06T 2207/10032; G06T 2207/20016; G06T 2207/20084
See application file for complete search history.

(56) References Cited

PUBLICATIONS

Choi, Junho et al: "BRM Localization: UAV Localization in GNSS-Denied Environments Based on Matching of Numerical Map and UAV images", 2020 IEEE/RSJ International Conference on Intelligent Robots and Systems (IROS), Aug. 5, 2020 (Aug. 5, 2020), pp. 4537-4544, XP093123258, https://arxiv.org/pdf/2008.01347.pdf.

Extended European Search Report, European Patent Office Application No. 21874732.7, dated Feb. 9, 2024, 9 pages.
Goforth, Hunter et al: "GPS-Denied UAV Localization using Pre-existing Satellite Imagery", 2019 International Conference on Robotics and Automation (ICRA), IEEE, May 20, 2019 (May 20, 2019), pp. 2974-2980, XP033593521, DOI: 10.1 109/ICRA.201 9.8793558.
Nassar, Ahmed et al: "A Deep CNN-Based Framework For Enhanced Aerial Imagery Registration with Applications to UAV Geolocalization", 2018 IEEE/CVF Conference on Computer Vision and Pattern Recognition Workshops (CVPRW), IEEE, Jun. 18, 2018 (Jun. 18, 2018), pp. 1594-159410, XP033475501, DOI : 10.110 9/CVPRW. 2018. 00201.
Tian, Yuxin et al: "Cross-Time and Orientation-Invariant Overhead Image Geolocalization Using Deep Local Features", 2020 IEEE Winter Conference on Applications of Computer Vision (WACV), IEEE, Mar. 1, 2020 (Mar. 1, 2020), pp. 2501-2509, XP033771050, DOI: 10.1109/WACV45572.2020.9093403.
Patel, B., "Virtual Localization for UAVs in Outdoor GPS-Denied Environments," 2019, PhD Thesis, University of Toronto, 74 pages.
Fan, H. et al., "Siamese Cascaded Region Proposal Networks for Real-Time Visual Tracking," Proceedings of the IEEE/CVF Conference on Computer Vision and Pattern Recognition, Jun. 15-20, 2019, 7952-7961.
Zhu, Y. et al., "Rotated Cascade R-CNN: A Shape-Robust Detector with Coordinate Regression," Pattern Recognition, 2019, 96:106964, 11 pages.
PCT International Search Report and Written Opinion, PCT Application No. PCT/IL2021/051171, Dec. 30, 2021, 7 pages.
Zhang, Z., et al., "Deeper and Wider Siamese Networks for Real-Time Visual Tracking," Proceedings of the IEEE/CVF Conference on Computer Vision and Pattern Recognition (CVPR), 2019, pp. 4591-4600.

* cited by examiner

SYSTEM AND METHOD FOR VISUAL LOCALIZATION

FIELD OF THE INVENTION

The present invention relates to the field of localization systems. More particularly, the invention relates to a method for providing visual-aided localization of an aerial platform, such as, for example, an Unmanned Aerial Vehicle (UAV) in the presence of large uncertainty. In one aspect, the method involves detection of similarities between a sensor image and multiple reference image patches through correlation in spatial feature domain.

BACKGROUND OF THE INVENTION

Recent developments in Unmanned Aerial Vehicles (UAV) opened the door to a spectrum of new use cases, including environmental monitoring, industrial inspection, and land mapping. Most of these applications require precise six degrees of freedom (6-DoF) localization, which can be provided through Inertial Measurement Unit-Global Positioning System (IMU-GPS) systems. An alternative localization approach relies on vision technology, in which a GPS-aligned satellite imagery serves as a reference map for a set of images captured by the UAV vision sensor. These methods rely on heavy photo-metric similarity between the UAV images and the reference visual map, as shown for example in FIG. 1, which illustrates the visual localization task. In the presence of large uncertainty region, the localization problem can be split into two independent tasks: a coarse search along the uncertainty region in order to detect candidate regions, followed by high accuracy 6-DoF estimation, denoted alignment, in which the UAV and the candidate images are aligned. The first task relates to an image retrieval task. Examples of image retrieval methods include traditional Bag-of-Words and voting approaches, compact descriptor representation such as Vector of Locally Aggregated Descriptors (VLAD) or its latest convolutional neural network (CNN) variant NetVLAD, and Siamese CNN network, in which image pairs are mapped into feature domain through CNNs with identical or different weights, followed by detection and or classification layers. Applications of Siamese models can be found in cross-view matching of ground to aerial localization and in visual-2D to 3D matching. All these methods, however, are not applicable to the problem of visual localization, due to complexity issues involved with large reference image search. A related field of research which deals with similar problem of localization of a target image in a reference image map is visual tracking. Moreover, existing localization methods do not directly address the combined optimization of rate-complexity-configuration, where configuration refers to the computation complexity of each stage, and thus are limited to small uncertainty reference search regions. Furthermore, there is no mathematical modeling how cascade modeling of Siamese detectors should train and execute in order to optimize this task.

In recent years cascade architecture methods had been introduced to deep learning solutions with application to detection, segmentation and tracking tasks. A class of architecture which is the base for these methods is the two stage R-CNN framework, combining a region proposal network detector (RPN) and a region-wise classifier. R-CNN model defines detection according to Intersection over Union (IoU) criteria between the bounding boxes of the target and the detection anchor. The cascade R-CNN, an object detector composed of a sequence of R-CNN detectors with increasing IoU threshold, was developed to address the problem of over fitting due to vanishing positive samples for large IoU detection thresholds. Based on boosting method, this model was optimized stage by stage, with bounding box distribution for each stage defined by detection results of the previous one.

For example, in the field of autonomous navigation, region localization is considered an important task that requires visual-aided localization of Unmanned Aerial Vehicle (UAV) in the presence of large uncertainty region. A natural solution for this task is the Siamese-RPN which was developed to detect similarities between a sensor image and multiple reference image patches through correlation in spatial feature domain. However, the Siamese-RPN detection suffers from several major drawbacks, such as computation complexity, termed configuration, and the limited detection associated with the shallow nature of feature extraction subnetwork.

It is an object of the present invention to provide an efficient system for the visual-aided localization of UAV in the presence of large uncertainty region.

It is another object of the invention to provide a system adapted to provide a cascade of series of RPN detectors that focus on detection accuracy, in order to provide joint optimization of true-positive vs. false-positive rate.

It is yet another object of the present invention to provide a system adapted to optimize the computation complexity, termed configuration, and the limited detection associated with the shallow nature of feature extraction subnetwork.

It is a further object of the present invention to provide a cascade optimization framework, which applies to a general multi-class-multi-stage detection, for joint optimization of rate and configuration.

It is still another object of the present invention to a new embedded Cascade Siamese-RPN architecture, optimized for detection and complexity, with application to localization task.

Other objects and advantages of the invention will become apparent as the description proceeds.

SUMMARY OF THE INVENTION

The present invention relates to a computer-implemented method of processing a geo-location of an aerial platform, such as for example, an Unmanned Aerial Vehicle (UAV). In one embodiment of the invention this is performed on any suitable local or remote device, such as, for instance, an edge device having one or more processors and memory, storing one or more programs for execution by the one or more processors to perform the method, comprising:
  providing a set of classification stages, which is trained end-to-end to provide a set of cascade decisions, wherein each cascade decision is optimized for a different classification modality;
  receiving a geo-location query comprising an aerial sensor image, a reference bird's eye view image-map with coordinate system (also referred to hereinafter as "satellite image-map" for the sake of brevity) and a measurement of pose of the aerial sensor with respect to image-map coordinate system;
  projecting the aerial sensor image onto the coordinate system of the reference satellite image-map;
  matching between the projected sensor image and corresponding image patches in the reference satellite image-map, by applying said set of classification stages in accordance with features extraction from said images and similarity criteria;

generating a cascade sequencing, wherein a classification score is aggregated along a cascade path among said set of cascade stages;

Generating a cascade sequencing, wherein a classification decision is defined according to defined sequencing decision logic;

retrieving a geo-location associated with said aggregated classification decision; and sending the retrieved geo-location to a geo-location requester.

In the context of this specification, when reference is made for the sake of brevity to "UAV," it should be understood to apply without limitation to all aerial platforms relevant to the matter herein described. According to an embodiment of the invention, the cascade stages are based on a Siamese-RPN architecture and on a multi feature pyramid extraction design, which comprises parallel paths of feature extraction stages, each of which is tuned for a different detection modality, According to another embodiment of the invention, the classification stages are trained end-to-end according to an Optimal Configuration Cascade (OCC), which applies the cascade detection loss for each stage of the cascade, so that exit points along the cascade are optimized.

According to another embodiment of the invention, the classification stages are trained end-to-end according to a Complexity Configuration Cascade (CCC), which applies the cascade detection loss and computation loss for each stage of the cascade, so that exit points along the cascade are optimized subject to a constraint on computation complexity.

According to one embodiment of the invention, the cascade decision is based on a successive classification process.

In one embodiment of the invention, the cascade path comprises parallel paths and sequential paths.

According to a specific embodiment of the invention, the set of cascade stages is based on a cascade Siamese localization, which comprises:
- a feature extraction sub-branch that includes a single Backbone network and multiple feature pyramid generators; and
- an RPN subnet, comprised of a cascade of RPNs, which provides an estimate of detected class (cls) and of the bounding box shape (reg).

DETAILED DESCRIPTION OF THE INVENTION

Throughout this description the term "UAV" is used to indicate a component of an aerial platform, such as for example an unmanned aircraft system (UAS), which include a UAV, a remote controller, and a system of communications between the two. The flight of UAVs may operate with various degrees of autonomy: under remote control by a human operator, autonomously by onboard computers, or piloted by an autonomous robot. This term does not imply any particular form of an aircraft, and the invention is applicable to all suitable type of powered, aerial vehicle that does not carry a human operator, uses aerodynamic forces to provide vehicle lift, can fly autonomously or be piloted remotely, can be expendable or recoverable, and can carry a lethal or nonlethal payload.

The term satellite image-map (or bird's eye view) refers to an aerial image capture through a sufficiently distant camera so that piece-wise plane approximate of the region is satisfied.

Figure 1:
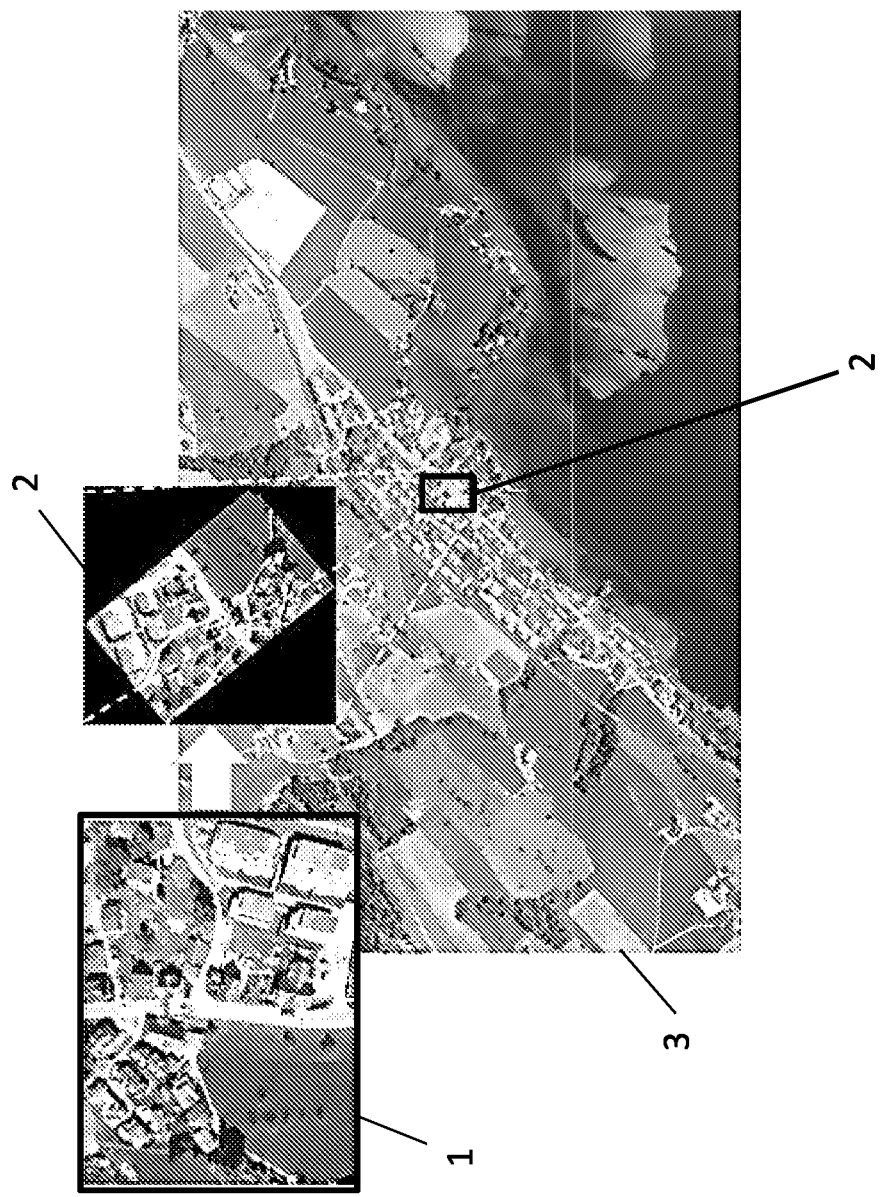
FIG. 1 schematically illustrates the processing stages in a shift-invariant localization of a sensor image, captured by the camera of a UAV, with respect to a reference satellite image-map.

FIG. 1 schematically illustrates the processing stages in a shift-invariant localization of a sensor image 1, captured by a camera of a UAV, with respect to a reference satellite image-map 3 (i.e., the search image). In order to obtain the shift invariance search property, the sensor image 1 is projected 2 onto the coordinate system of the search image 3 based on pose measurements of the sensor with respect to the coordinate system. Localization is obtained via matching between the projected sensor image 2 and corresponding image patches 4 in the reference satellite image-map 3.

According to an embodiment of the invention, in order to minimize the computation complexity of similarities detection between a sensor image and multiple reference image patches, the system provides a general multi-class cascade detection framework, composed of a set of multi-class detectors, for joint optimization of detection and configuration. According to another embodiment of the invention, similarity measure is performed through correlation in spatial feature domain. Based on this framework model, the system provides a novel Panoptic Cascade Siamese RPN architecture, composed of a set of classification stages, which is trained end-to-end to solve a problem.

According to an embodiment of the invention, the cascade stages are based on a Siamese-RPN architecture and on a new multi feature pyramid extraction design, composed of parallel paths of feature extraction stages, each of which is tuned for a different detection modality. According to a feature-pyramid particular embodiment, the expressivity of extracted features increases along stages within each path of feature pyramid. According to yet another embodiment of the invention, using the system of the present invention, proper allocation of large amount of allocated features results in learned features related to complex textures, termed texture modality, while allocation of small amounts of extracted features results in learned features, which can be regarded as natural semantic representations of the image, and can be used for "natural semantic" segmentation of natural images. The novel system enables to provide improved detection accuracy and reduced computation complexity over non-cascaded designs.

Reference will now be made to several embodiments of the present invention, examples of which are illustrated in the accompanying figures. Wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention.

While the invention will be described in the general context of program modules that execute in conjunction with an application program that runs on an operating system on a computer system, those skilled in the art will recognize that the invention may also be implemented in combination with other program modules.

The invention may be practiced on a low power edge-device attached to the image sensor or else located on-board of the UAV or on medium power device located on a remote host. The invention may also be practiced in distributed computing environments where tasks are performed by remote processing devices that are linked through a communications network. In a distributed computing environment, program modules may be located in both local and remote memory storage devices.

Figure 2:
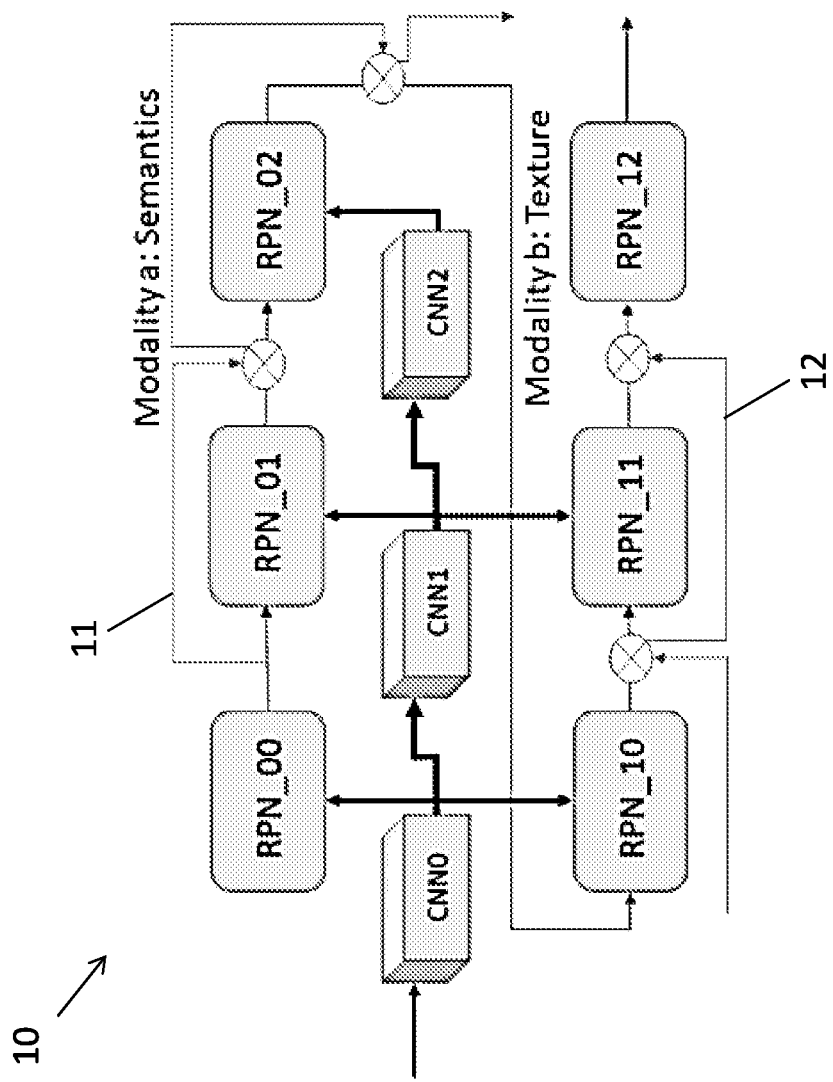
FIG. 2 schematically illustrates a block diagram of a multi-modality cascaded detection model, according to an embodiment of the invention.

FIG. 2 schematically illustrates a block diagram of a multi-modality cascaded detection system 10, according to an embodiment of the invention. System 10 is a panoptic cascade composed of cascade paths of different classification modalities, such as semantics (e.g. urban/non-urban/terrain), features (higher detail info—e.g. texture types), etc., as indicated in the figure by "modality a: semantics" and "modality b: texture". System 10 comprises a plurality of convolutional neural network (as shown by CNN0, CNN1 and CNN2 in FIG. 2) and a plurality of region proposal network detectors (as shown by RPN_00, RPN_01, RPN_02, RPN_10, RPN_11, and RPN_12 in FIG. 2). In this configuration, each of the combinations CNN0-RPN_00, CNN0-CNN1-RPN_01, CNN0-CNN1-CNN2-RPN_02 refers to a single stage classifier detector that forms together a first cascade classification modality (in this example, modality a: semantics), and each of the combinations CNN0-RPN_10, CNN0-CNN1-RPN_11, CNN0-CNN1-CNN2-RPN_12 refers to a single stage classifier detector that forms together a second cascade classification modality (in this example, modality b: texture). The skip paths (e.g., as indicated by numerals 11 and 12) refer to the propagation of detection probabilities, as will be described in further details hereinafter with respect to the Multi-Class Cascade Detection.

Example

We refer now to a localization architecture based on a cascade detection framework, according to an embodiment of the present invention. In this embodiment, the localization architecture is based on the Siamese-RPN architecture.

The Siamese-RPN system consists of a Siamese feature extraction subnetwork and of a Region Proposal subnetwork composed of classification and regression subnets. The feature extraction subnetwork includes two sub branches: the template branch which processes the sensor template-image, and the target branch which receives the target reference-image. The system of the present invention adopts a fully convolutional implementation of these sub branches without padding, which was shown to provide unbiased estimate of position within the reference image. The two branches may share the same weights, or different weights in the case of different capture classification modalities of the input images. The region proposal subnetwork consists of two output branches; one for classification and the other for regression, where for each two-dimensional (2D) spatial position in reference image coordinates, the classification branch provides the estimated detected class, and the regression one provides an estimate of spatial shape deformation of the detected class with respect to a reference anchor size. Consider the template image z and the reference image x and let $\psi(\omega, \vartheta)$ denote the output of the Siamese subnetwork branch, where $\vartheta$ denotes the subnet weights, the distance function between the template image and reference patches within x is defined by the correlation operator, as shown with respect to the following formula 1:

$$f_U^s(z, x) = [\psi^s(z)]_u * [\psi^s(x)]_u + b_u^s \qquad (1)$$

where
b is used to model the offset of the similarity value
u=ω×h×f, where w×h refers to the 2D spatial grid and f to the number of features s refers to classification (s=cls) and to regression (s=reg) outputs of the RPN subnetwork, respectively.

Figure 3A:
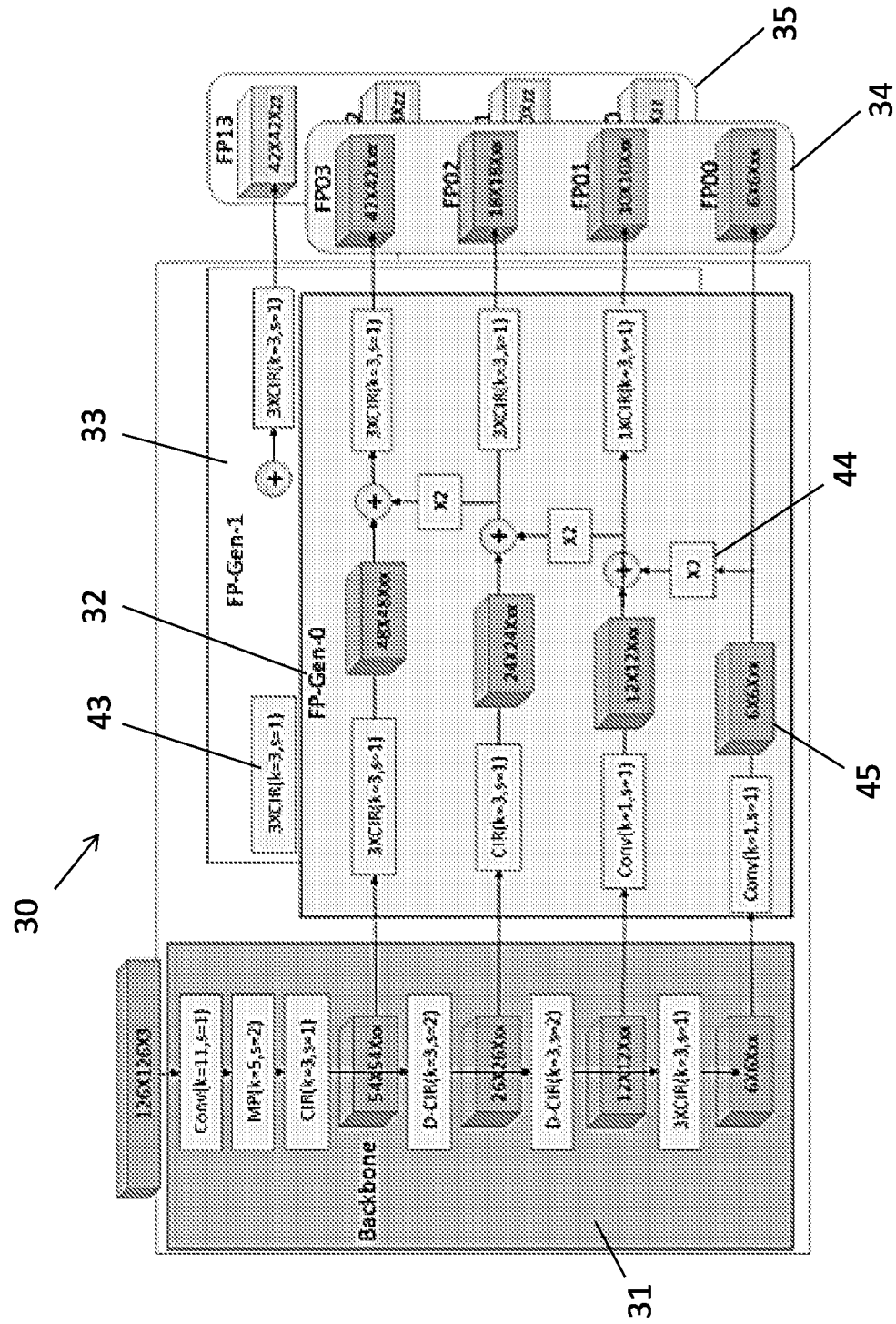
FIGS. 3A-3C schematically illustrates the building blocks of a cascade Siamese localization, according to an embodiment of the invention.
Figure 3B:
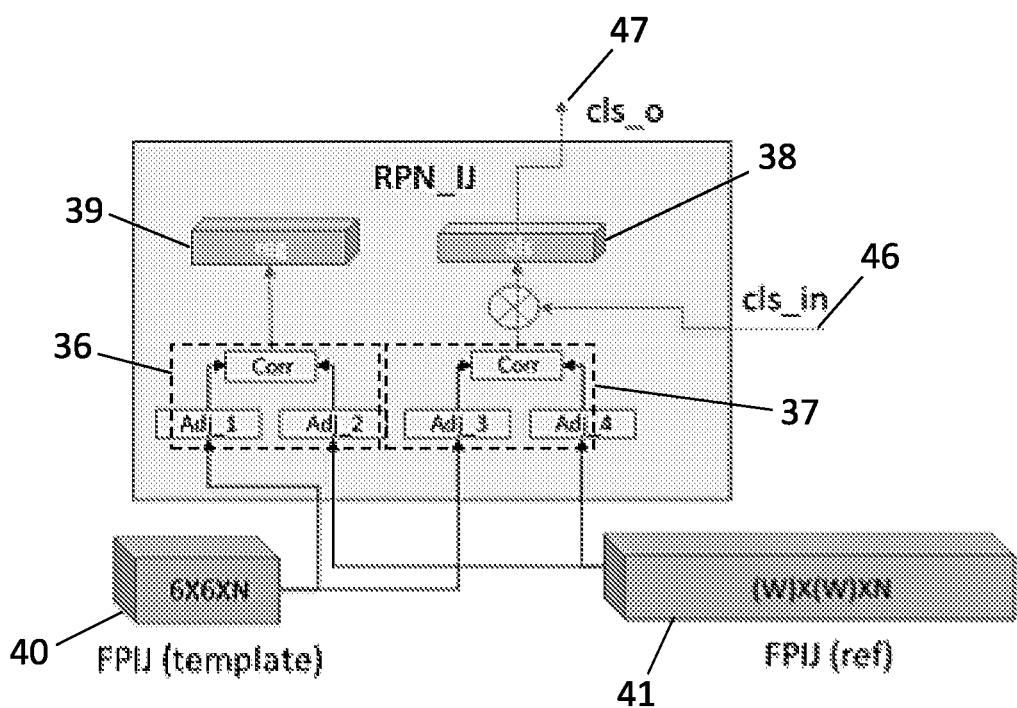
Figure 3C:
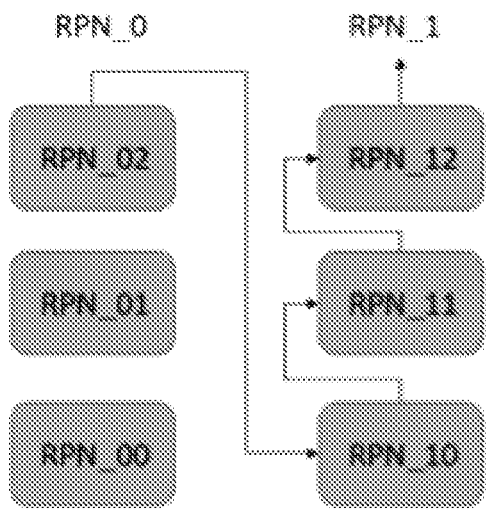

Consider k basic anchor shapes, where a shape can also refer to different scales of spatial axes, and let l denote the number of regression parameters, the number of output features f is equal to 2k in the case of s=cls and to lk for s=reg The building blocks of the cascade Siamese solution of the invention are described in detail in FIGS. 3A-3D. As schematically illustrated in FIG. 3A, the feature extraction subnetwork 30 comprises a single backbone subnetwork 31 and multiple feature pyramid generators 32, 33 (such as FP-Gen-0 and FP-Gen-1, respectively), each of which is tuned for a different detection modality 34 and 35 respectively. FIG. 3B schematically illustrates the RPN subnet which provides an estimate of the detected class (cls) 38 and of the bounding box shape (reg) 39. As shown in FIG. 3B, RPN_IJ contains two similar sub-modules 36 and 37, where 36 is used to estimate the box regression and 37 the classification score. Each module has two inputs FP_IJ(ref) and FP_IJ(template) generated by FP-Gen-I of the template image processing and FP-Gen-I of the reference image processing. Each RPN_IJ has a cls_in input and a cls_out output, 46 and 47, respectively, used for aggregation of classification scores.

The classification scores of the RPN modules are aggregated according to the defined cascade detection sequencing. See FIG. 3C that shows an example of cascade detection sequencing as indicated by RPN_00-RPN02 following by RPN_10-RPN12.

Figure 3D:
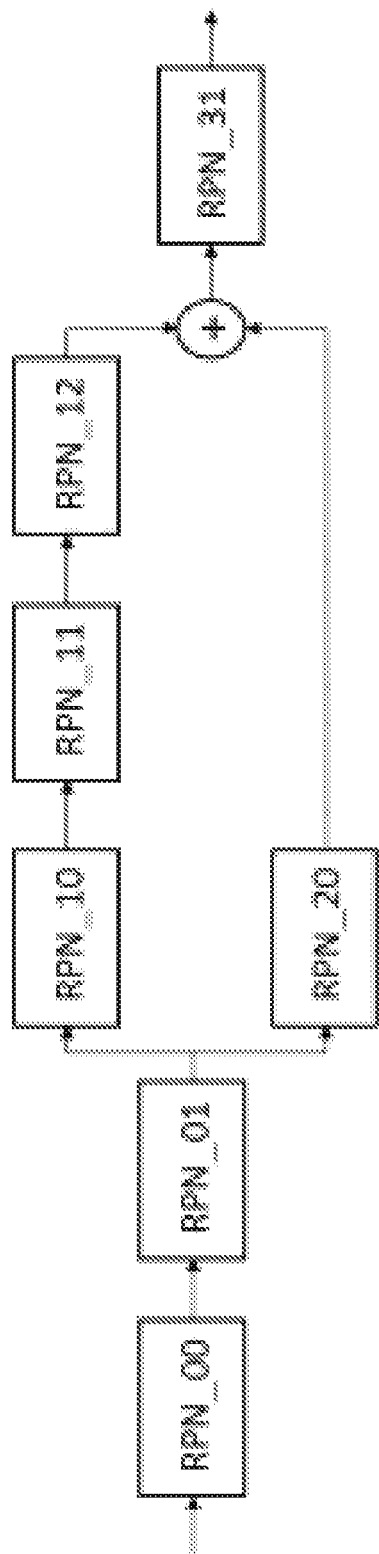
FIG. 3D is an example of cascade detection sequencing composed of serial and parallel paths of serial sub-cascades.

Another example of cascade detection sequencing is composed of serial and parallel paths of serial sub-cascades, as illustrated as an example in FIG. 3D. According to an embodiment of the invention, the entire system is trained end-to-end according to an Optimal Configuration Cascade (OCC), which applies the cascade detection loss for each stage of the cascade, so that exit points along the cascade are optimized. The OCC will be described in further details hereinafter with respect to Multi-Class Cascade Detection. According to another embodiment of the invention, the entire system is trained end-to-end according to OCC subject to a computation complexity constraint.

An example of cascade detection model and optimization algorithms, which are used to optimize the cascade performance in terms of rate and configuration, is described hereinafter. Consider a cascade classification problem, wherein classification is decomposed into N independent consecutive stages, for some N.

Let $y^N=\{y^N, y^{N-1}, \ldots y^1\}$ denote the response function of the cascade where $y^j=\{y_1^j, \ldots, y_K^j\}$ denotes the response of stage j, $y_i^j=\{0,1\}$ and $\Sigma_{i=1}^K=1$ and let $\Phi^j=\{\Phi_1^j, \ldots, \Phi_K^j\}$ denote the vector of corresponding probabilities where $\Phi_i^j=P(y_i^j=1|x)$.

Under the independence assumption of each stage, we have the following formula 2:

$$P(y^N | x, \theta) = \prod_{j=1}^{N} \prod_{A=1}^{K} \phi_k^{y_k^j} \quad (2)$$

Example of a cascade detection definition:

Given a cascade of N stages, a cascade detection assumes detection of class I for some $1 \leq I \leq K-1$, iff $y_I^j=1$ for all $j \leq N$ and class K otherwise, where class K denotes non target. Another form of cascade assumes detection of class I for some $1 \leq I \leq K-1$, iff $y_K^j=0$ for each $j<N$ and $y_I^N=1$.

Under the above cascade detection definition, the detection probability satisfies $$P(y^i | x, \theta) = \prod_{k=1}^{K-1} \left(\prod_{j=1}^{i} \phi_k^j\right)^{y_k} \cdot (\Phi_K^i)^{y_K} \text{ for each } i \leq N = \quad (5)$$

$$\exp\left(\sum_{k=1}^{K-1} y_k \left[\sum_{j=1}^{i} \log(\phi_k^i) - \log(\Phi_K^i)\right] + \log(\Phi_K^i)\right)$$

where $$\Phi_K^i = \left(1 - 1^T \prod_{j=1}^{i} \phi^j\right) \quad (6)$$

is the probability of class K and 1 is a column vector of ones of size K.

Example of optimization algorithm which search for the optimal parameters of (5) and (6) is given by the minimization of the following loss function, which refer to maximum likelihood criteria:

$$\text{Closs}(y^i, x, \theta) = -\log P(y^i | x, \theta) = \sum_{k=1}^{K-1} y_k \left[\sum_{j=1}^{i} \log(\phi_k^i) - \log(\Phi_K^i)\right] \quad (10)$$

Optimization algorithms for the cascade classifier which are based on the above detection probability of the cascade, and on the loss function (10) are defined as follow:

Cascade optimization—Two types of cascade optimization are considered: Optimal configuration cascade (OCC), referring to configuration optimization, and Complexity-Constrained Cascade (CCC) optimization.

Looking now at the OCC, the probability of the response function (5) should apply to each $I \leq N$. Based on (10, the OCC cascade loss is given by:

$$\text{OCCLoss}(y^N, x, \theta) = \sum_{i=1}^{N} \text{Closs}(y^i, x, \theta) \quad (13)$$

When applying the CCC model, on the other hand, the computational complexity per stage is proportional to the detection rate at the previous stage of the cascade. Assuming computational complexity of $T_j$ per stage J of the cascade, the expected computation complexity of the cascade of size N is given by:

$$\text{CPxLoss}(y^N, x, \theta) = \sum_{i=1}^{N-1} E[y^i | x] \cdot T_{i+1} \quad (14)$$

The Complexity-Constrained Cascade loss is defined as a weighed sum of (13) and (14), where $$\text{Closs}(y^i, x, \theta) = -\log P(y^i | x, \theta) = \sum_{k=1}^{K-1} y_k \left[\sum_{j=1}^{i} \log(\phi_k^i) - \log(\Phi_K^i)\right] \quad (10)$$

The following is an example of implementation details of the cascade which is based on Siamese-RPN architecture:

Basic units: In order to obtain the shift invariance property, all network modules in the system, including basic convolutional and maxpool layers, are implemented with zero-padding, or with conventional padding followed by a proper crop. This restriction results in a spatial dimension reduction of kernel-size minus one following processing by each of these layers. According to an embodiment of the invention, the higher-level blocks in the solution, which comply with the shift-invariance requirement, can be the cropping inside residual (CIR) and the Downsampling CIR (CIR-D) as disclosed by Z. Zhang and H. Peng, "Deeper and wider Siamese networks for real time visual tracking," *CVPR* 2019, 2019. The up-sampling in the feature pyramid subnet, described by X2 module, is implemented through a simple bilinear interpolation. Other more complex up-sampling techniques, such as deconvolution, unpolling and so, may also apply.

Feature extraction subnetwork: Each branch of feature extraction, described in FIG. 3A, is composed of the single backbone subnetwork 31, which is a shift invariant extension to Residual Network (ResNet) architecture (which is a known CNN architecture that was designed to enable hundreds or thousands of convolutional layers), and of multi feature-pyramid FP-Gen sub-nets. In this figure n×block refers to n successive applications of block processing, where a block can be one of the types defined in Basic units hereinabove. As an example, 3×CIR(k=3, s=1) (as indicated by numeral 43) refers to processing composed of three successive blocks of type CIR, where k and s define the kernel size and the stride, respectively. Note that the padding size is equal to zero. The x2 block 44 refers to bilinear up-sampling by a factor of two along both spatial axes.

According to an embodiment of the invention herein exemplified, the system considers a minimal spatial-convolution size of 4×4 at the corresponding RPN module, which corresponds to the lower level of the pyramid. This size was empirically found to provide a sufficient distance measure between image patches. The design was made such that distance convolutions at the RPN-IJ would be at 4×4, 8×8, 16×16 and 42×42 along the four stages. For simplicity of design, an increase of spatial size by two between successive feature pyramid stages, results in spatial sizes of 6×6, 12×12, 24×24 and 48×48 at the outputs of the feature pyramid up-sampling modules (e.g., as indicated by numeral 45). The template image size which was found to provide these outputs was 126×126. Finally, skip-layers, of a 1×CIR, 3×CIR and 3×CIR were used to adjust the up-sampling outputs to the FP-Gen spatial outputs defined by 6×6×xx, 10×10×xx, 18×18×xx and 42×42×xx, where xx refers to the number of features. According to this particular embodiment of the invention, the effective output strides of the four stages of FP-Gen with respect to the input resolution was of 8, 8, 4 and 2, where the first refers to the 6×6 output. Consider a reference image of size K times the size of the template image along both spatial axes. It can be shown that the FP-Gen-outputs of the reference-image branch are of sizes ((126×(K−1)−1+stride)//stride) along the spatial axes, where stride refers to the effective stride of the corresponding stage with respect to the reference image.

According to an embodiment of the invention, the RPN-Cascade is composed of a set of basic RPN modules, each connected to the corresponding FP-Gen output. Each RPN_IJ has two inputs, FP_IJ output 40 from the sub-branch which processes the sensor-template image and FP_IJ output 41 from the sub-branch which processes the reference image. The architecture, described in FIG. 3B, employs a spatial cross-correlation in feature space as a distance metric measure. Each RPN-IJ has two types of outputs: a spatial-classification and a spatial-regression, which provide estimates of classification and of shape regression, respectively. Each input is adjusted through a convolutional layer $Adj_i=Conv(k=3, s=1)$, one per input and output type, resulting in a total of four processing modules per RPN-IJ. The regression output provides shape scaling along both spatial axes with respect to defined anchor shape. In another embodiment of the invention this scaling is transformed into sensor height estimation of the sensor with respect to defined height of the reference anchor The system includes input and output controls, cls-in 46 and cls-out 47, which refer to the aggregation of detection probabilities (i.e., "detection class") along the cascade path. According to this embodiment of the invention, a spatial position that was classified as non-target at a given stage, will be set as non-target also at the following stages.

Detection threshold tuning of each of the stages and classes can be obtained as part of the training and the validation process.

According to defined cascade detection and to the detection probability model (5), the class of detection is computed during operation mode by the following algorithm code:

```
i = 0
class = 0
while i leq N or class not_eq K:
    class = arg max E[y[i]]
    i += 1
``` where y[i] refers to $y^i$ and E(•) refers to expectation operation.

Experimental Results

The experiments performed according to this example demonstrated localization in the presence of spatial position uncertainty of up to K times the size of average spatial projection of the sensor image on the reference image map along both spatial axes. Bounded elevation uncertainty of up to ten percent was assumed, as well as bounded error measures of sensor pose of up to five degrees along pose angles. The system was trained on a satellite image dataset and tested on a set of UAV flight captures. The experiments were made on three types of architecture configurations: two models with a single FP-Gen, one with 64 features per stage, and the other with 16. The third configuration was with two FP-Gen with the first with 16 features per stage and the second with 64.

A. Data Sets

1) Test dataset: The test dataset included image captures of drone flights over a village and city areas, using a monocular downward-facing visual camera. The captures were made at a height of 150 meters and at bounded roll angles. In addition to GPS measurements, precise measures of pose and height were taken for each captured image, which were used to calculate the projection of the sensor image on the reference image. For each captured image a globally aligned satellite image with size of ten times the size of the projected sensor image was constructed, such that the projected image belongs to this region. The sensor and the reference images were sampled at 126×126 and at 1260×1260 pixels respectively, at around 1 pixel per meter. The test set included 350 image pairs.

2) Training dataset: The training data set was constructed from aligned satellite image pairs, each captured at a different date, so that one can be used for sensor synthesis and the other as a reference. The spatial sizes of the images were chosen to be the same as the size of the reference images in the test dataset. The training dataset contained 1100 training and 200 test pairs. During the training stage, a synthesized sensor image was cropped at a random position for each training and test steps, so that the effective number of training and testing samples was in the order of millions.

B. Training

At each step in the training process, an image pair was randomly selected from the training dataset, with one image serving as a reference image and the other for sensor image synthesis. The synthesis included image cropping at a random position, followed by random scaling of up to ten percent and polygonal boundary cropping, which accounts to synthesis of the effective height and to the synthesized capture angles.

The entire system was trained end-to-end based on the loss (i.e., on the Optimal Configuration Cascade (OCC), which applies the cascade detection loss for each stage of the cascade, so that exit points along the cascade are optimized). The training was done over two thousand epochs with mini batches of size four. The ADAM optimizer was used with an initial learning rate of 5e−5, which was decreased by ten percent following each 200 epochs. It was found that this external decrease in learning gain helps to converge to sufficiently good minima. In the experiments up to three cascade stages were tested per FP-Gen module, which was found to be sufficient for the localization task. The training and testing were done on a standard desktop with a single NVIDIA® Geforce® RTX 2080 Ti graphics card.

In order to obtain good initialization for the model's weights, the cascade was initially trained to optimize the outputs of each stage separately. At the next stage of training, the entire system was trained according to the loss defined by the OCC. No additional pre-training dataset was required, as the proposed process showed good convergence.

The training and tests were done on three types of configurations, as described in Table 1: (a) a single modality path of the first three stages of FP-Gen with number of extracted features of 64 per stage, (b) a single modality path with only the third stage and with number of features 16, (c) a multi-modality path composed of RPN-02 with 16 features input, and RPN-11 and RPN-12 with 64.

TABLE 1

Training configurations: the active stages (provided in the parenthesis) and the number of output features per stage.

| Table head | Test configurations | |
| --- | --- | --- |
| | FP-Gen0 | FP-Gen1 |
| (a) Test-1 | 64/(0, 1, 2) | — |
| (b) Test-2 | 16/(2) | — |
| (c) Test-3 | 16/(2) | 64/(1, 2) |

Figure 4:
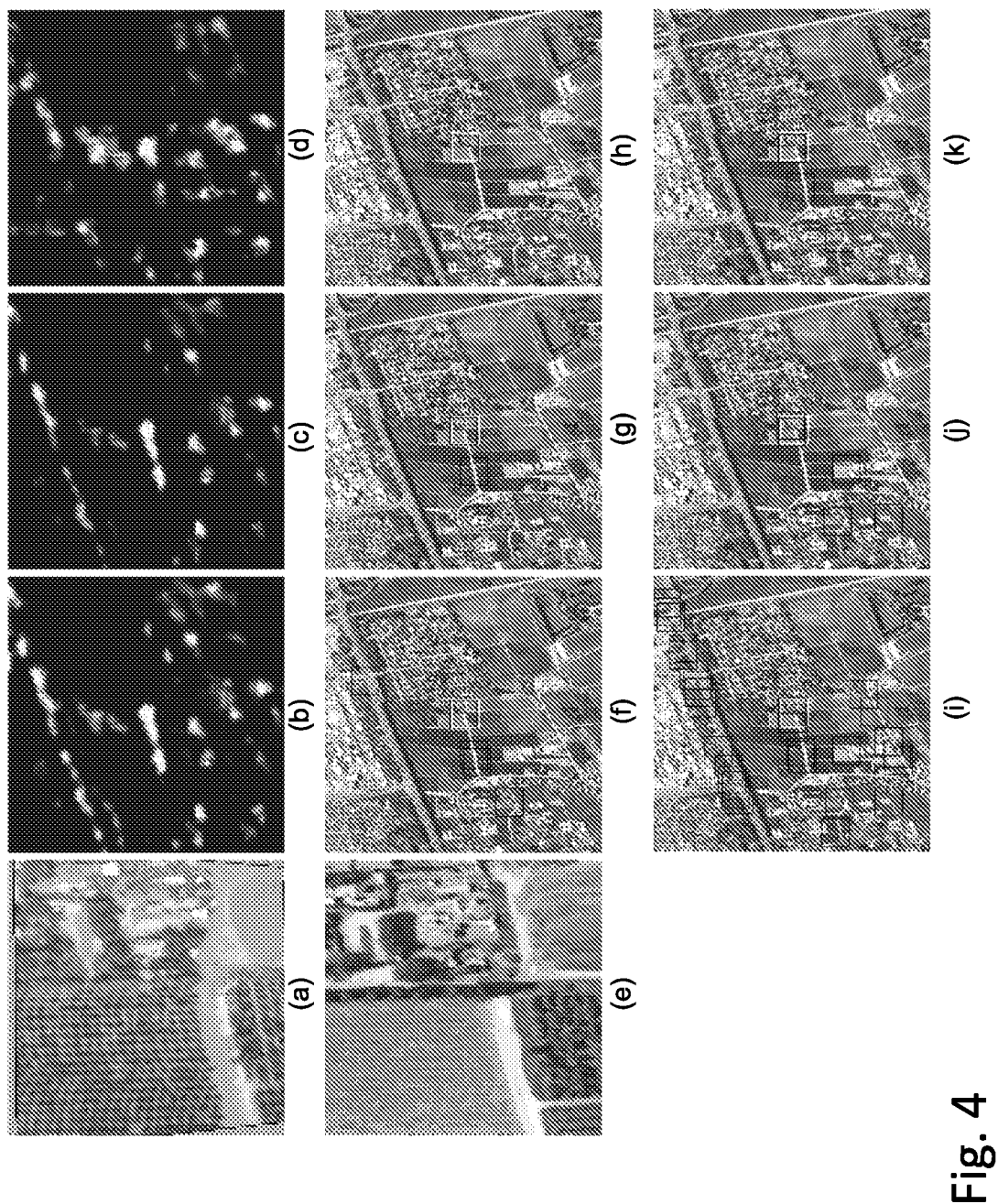
FIG. 4 shows a sample of the detection results of a single modality—three stage configuration of a first experiment (Test-1)
Figure 5:
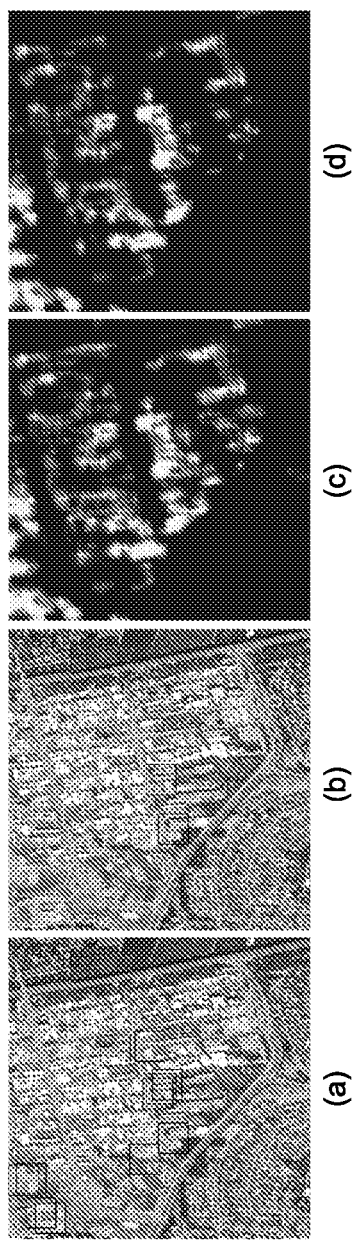
FIG. 5 shows another sample of the detection results of the three stage configuration of the first experiment.
Figure 6:
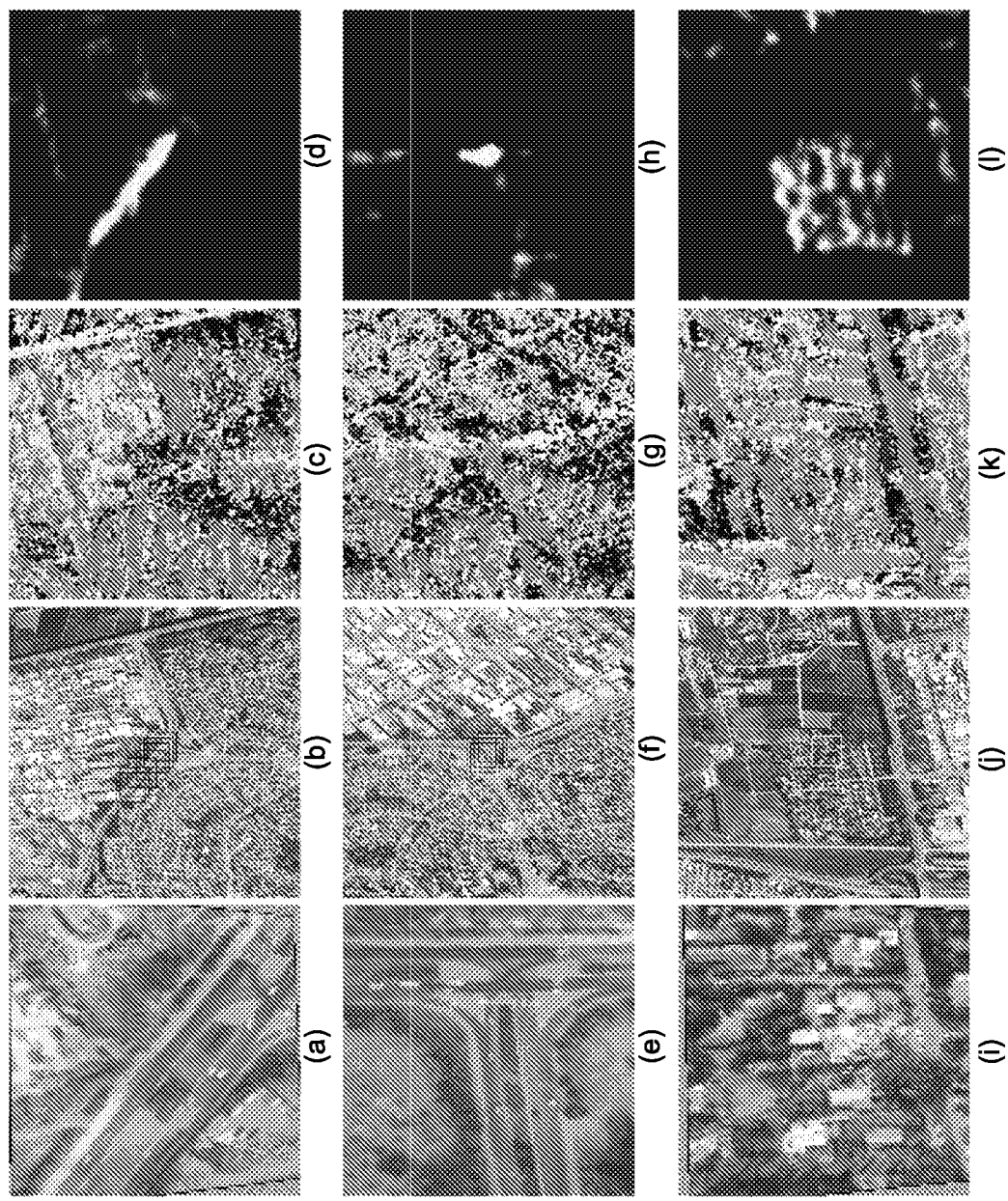
FIG. 6 shows a sample of the detection results of the one stage configuration of a second experiment (Test-2).

Examples of tests results for the configurations defined in Table 1 are provided in FIGS. 4-6, where the detections probabilities per stage are described through heat maps (which can be appreciated also in grayscale, as in the appended figures), and the ground truth position and detection proposals for some detection threshold, are plotted on the corresponding reference images through white and black rectangles, respectively.

In FIG. 4 and FIG. 5 two sample results of Test-1 configuration are shown. FIG. 4 shows a sample of the detection results of the single modality—three stage configuration of Test-1: (a) the template image, (e) the corresponding anchor image from the reference image, (b)-(d) the detection probabilities of stages 0, 1 and 2, and (f)-(h) the corresponding reference images with the detection results overlayed, where the true position is marked by the white rectangle and the detections by black rectangles. The corresponding detections in the case of non-cascaded optimization are provided in (i)-(k).

FIG. 5 shows another sample of the detection results of the three stage configuration of Test-1: (a) detections at stage 0, (b) detections at stage 2, and (c) detection probability at stage 0 and (d) detection probability at stage 2.

FIG. 4 describes a relatively complex localization problem, where three stages are required to converge to a single proposal output. The detection results of non-cascaded optimization, shown in FIG. 4 (i)-(k), demonstrate inferior detection at all stages. Furthermore, the higher number of detections at the first two stages refers to higher computation complexity. In FIG. 6 three sample results of Test-2 configuration are shown, which include only the third stage and with relatively low number of extracted features. FIG. 6 (c) describes the arg max operation on the output features of the reference image along the features axis, which demonstrates that feature extraction in this case essentially captures a natural semantic representation of the input image (indicated by different shades of gray), the intermediate shade referring to dense and to sparse urban areas, darker shades to trees and dense vegetation, and so forth. The heat map and corresponding detections of this mode, demonstrate the ability of small number of features to reject most parts of the search region with a relatively low complexity operation. Comparing the results of Test-1 to Test-3 configurations the following conclusions are obtained: while the detection capabilities of the entire cascade are comparable, Test-1 configuration results in lower complexity. However in case of localization characterized by major semantic information, such as in the cases described in FIG. 6, where localization refer to roads, junctions or urban vs. non-urban areas, a first stage semantic localization is preferred.

FIG. 6 shows a sample of the detection results of the one stage configuration Test-2: (a) the template image, (b) the reference image with the detection results overlayed, (c) the semantic representation of the output features of FP-Gen and (d) the detection probability of stage 2. (e)-(h) and (i)-(l) refer to another two detection samples.

A performance measure of localization, termed Normalized Detection Area (NDA), is defined by the detected area normalized by the average projection of the sensor image on the reference image. The NDA is measured as function of the detection rate. In Table 2 the localization performance of Test-1 configuration are summarized for three detection rates: 0.85, 0.90 and 0.95. The NDA results are provided through the median value and the 0.75 confidence region. The results demonstrate the improved performance along the cascade stages. In Table 3 the results of the proposed cascade localization are compared with existing non-cascaded and cascaded solutions, where non-cascaded localization was defined by the cascaded loss of H. Fan and H. Ling, "Siamese cascaded region proposal networks for real-time visual tracking," in CVPR 2019 without non-detection drop between stages and the cascaded one with the defined non-detection drop.

TABLE 2

Localization results according to an embodiment of the invention with Test-1 configuration

| Table detection-rate | NDA: median/0.75 confidence region | | |
| --- | --- | --- | --- |
| | Stage-1 | Stage-2 | Stage-3 |
| 0.85 | 4.8/9.5 | 4/7.5 | 3/7 |
| 0.90 | 5/12 | 4.5/9 | 3.5/7.5 |
| 0.95 | 8/15 | 7/14 | 6/10 |

TABLE 3

Localization results at 0.90 detection rate: (a) Test-1 non-cascaded, (b) Test-1 Siamese Cascaded RPN, (c) Test-1-ours and Test-3-ours

| Table detection-rate | NDA: median/0.75 confidence region | | |
| --- | --- | --- | --- |
| | Stage-1 | Stage-2 | Stage-3 |
| Test-1-non-cascaded | 17/33 | 6/12 | 5/10 |
| Test-1-Siamese-Cascaded | 15/32 | 6/15 | 4.5/12 |
| Test-1-ours | 5/12 | 4.5/9 | 3.5/7.5 |
| Test-3-ours | 13/23 | 4.5/9 | 3.5/7.5 |

According to the results, the proposed cascade solution outperforms existing non-cascaded and cascaded solutions both in terms of NDA and computation complexity. There is minor difference between the results of existing cascaded and non-cascaded solutions. We assume that this is due to the following: the cascade drop model of the cascade Siamese-RPN has minor effect in cases where the differences between targets and non-targets are very minor, such as in the localization task studied in this work. Furthermore, it was found that during training, even high-level thresholding of non-targets detections resulted in inferior performance, as this operation might also drop false non-targets detections. On the other hand, the cascade detection described herein optimizes the detection probability of the entire cascade, and does not involve false non-detections drops during training phase. In Table 3 the Test-3 configuration is also shown, where low-complexity 16 features Stage-2 replaces 64 features Stage-0 of Test-1 configuration. According to the results, while the new Stage-1 provides inferior results compared to Stage-1 of Test-1 configuration, it still outperforms the results of Stage-1 of existing cascaded and non-cascaded solutions, and overall converge to similar localization results of Test-1 configuration at Stage-2 and Stage-3

Unless otherwise indicated, the functions described herein may be performed by executable code and instructions stored in computer readable medium and running on one or more processor-based systems. However, state machines, and/or hardwired electronic circuits can also be utilized. Furthermore, with respect to the example processes described herein, not all the process states need to be used, nor do the states have to be performed in the illustrated order. Additionally, certain process states that are illustrated as being serially performed can be performed in parallel.

As will be appreciated by the skilled person, the arrangement described in the figures results in a system for optimizing cascade detection and classification architectures, for joint optimization of rate, configuration and complexity. Moreover, the system provides an extension to Siamese-RPN type cascade architecture, which combines multiple modality cascades, each characterized by a different complexity and optimized for a different detection modality. As aforementioned, the method was applied to UAV localization tasks where a template image is compared against a reference image map. The modality described herein referred to the number of extracted features which were used for the localization task. As shown in the examples above, multiple cascade stages provide better results than the existing single stage solution, at a complexity comparable to the lowest stage complexity. It was also shown that a small number of output features resulted in extracted features which resemble a natural semantics representation of the input and reference images.

All the above description and examples have been given for the purpose of illustration and are not intended to limit the invention in any way. Many different methods of analysis, electronic and logical elements can be employed, all without exceeding the scope of the invention.

The invention claimed is:

1. A computer-implemented method for processing a geo-location of an aerial platform, comprising:
providing a set of classification stages, which is trained end-to-end to provide a set of cascade decisions, wherein each cascade decision is optimized for a different classification modality and for different spatial resolution;
receiving a geo-location query comprising an aerial sensor image, a reference bird's eye view image-map with coordinate system and sensor pose angles measures with respect to the coordinate system;
projecting the aerial sensor image onto the coordinate system of the reference bird's eye view image-map using the pose angles measures;
matching between the projected sensor image and corresponding image patches in the reference bird's eye view image-map, by applying said set of classification stages in accordance with features extraction from said images and similarity criteria;
generating a cascade sequencing, wherein a classification score is aggregated along a cascade path among said set of cascade stages;
generating a cascade decision at each stage along the cascade path based on the aggregated classification score and on defined decision logic between successive stages;
retrieving a geo-location associated with said aggregated classification decision; and
sending the retrieved geo-location to a geo-location requester.

2. The method according to claim 1, comprising:
matching between the projected sensor image and corresponding image patches in the reference bird's eye view image-map, by applying said set of regression stages in accordance with features extraction from said images and similarity criteria;
defining a set of basic anchor shapes each refers to specific height of the sensor image with respect to reference coordinate system of the reference bird's eye view image-map;
generating classification score, where classification refers to a detection type and to an anchor shape;
generating a cascade regression at each stage along the cascade path, providing an estimation of scaling between shapes of defined anchors and the projection of the sensor-image;
deriving the shape of the projected sensor-image based on classification decision of anchor shape and on regression scaling; and
deriving the sensor height based on the regression scaling.

3. The method according to claim 1, wherein the cascade stages are based on a Siamese-RPN architecture with two inputs, namely the projected image of the sensor-image and the reference bird's eye view image-map, and for each input on a multi feature pyramid extraction design, which comprises parallel paths of feature extraction stages, each of which is tuned for a different detection modality.

4. The method according to claim 1, wherein feature extraction for reference bird's eye view image-map is executed in advance, and the entire process during sensor-image capture.

5. The method of claim 1, wherein modality refers to the amount of extracted features, where small amount refers to semantic, and large to texture.

6. The method of claim 1, wherein the extracted features are adapted to be used as natural semantic representations of the image.

7. The method according to claim 1, wherein the classification stages are trained end-to-end according to an Optimal Configuration Cascade (OCC), which applies the cascade detection loss for each stage of the cascade.

8. The method of claim 7, wherein OCC is applied subject to a constraint on computation complexity.

9. The method according to claim 1, wherein the cascade decision is based on a successive classification logic.

10. The method according to claim 9, wherein the successive classification logic comprises defined disagreement of decisions with respect to previous stage or non-target decision at a given stage results with non-target decision.

11. The method according to claim 1, wherein the cascade path comprises parallel paths and sequential paths.

12. The method according to claim 1, wherein each stage refers to different expressivity of function approximation and to different spatial resolution.

13. The method according to claim 1, wherein the set of cascade stages is based on a cascade Siamese localization, which comprises:

a) a feature extraction sub-branch that includes a single Backbone network and multiple feature pyramid generators; and
b) an RPN subnet, comprised of a cascade of RPN detectors, which provides an estimate of detected class (cls) and of the bounding box shape (reg).

14. The method according to claim 13, wherein a feature pyramid generator is characterized by increased expressivity of function approximation and by increased spatial resolution along the pyramid outputs.

15. The method of claim 1, wherein the aerial platform is an Unmanned Aerial Vehicle (UAE).

16. A system for processing a geo-location of an aerial platform, comprising:
Circuitry adapted to operate a set of classification stages, which is trained end-to-end to provide a set of cascade decisions, wherein each cascade decision is optimized for a different classification modality;
Circuitry adapted to receive a geo-location query comprising an aerial sensor image, a reference bird's eye view image-map with coordinate system and measures of the sensor pose angles;
Circuitry adapted to project the aerial sensor image onto the coordinate system of the reference bird's eye view image-map based on pose angles measures;
Logical means adapted to match between the projected sensor image and corresponding image patches in the reference bird's eye view image-map, by applying said set of classification stages in accordance with features extraction from said images and similarity criteria operating on these features;
Circuitry adapted to generate a cascade sequencing, wherein a classification score is aggregated along a cascade path among said set of cascade stages;
Circuitry adapted to generate a cascade decision at each stage along the cascade path based on the aggregated classification score and on defined detection logic between successive stages;
Circuitry adapted to retrieve a geo-location associated with said aggregated classification decision; and
Communication apparatus configured to send the retrieved geo-location to a geo-location requester.

* * * * *